United States Patent [19]

Jenness

[11] Patent Number: 5,000,680
[45] Date of Patent: Mar. 19, 1991

[54] ROTARY KILN

[75] Inventor: Raymond C. Jenness, Delafield, Wis.

[73] Assignee: Boliden Allis, Inc., Milwaukee, Wis.

[21] Appl. No.: 480,286

[22] Filed: Feb. 15, 1990

[51] Int. Cl.$^5$ .............................................. F27B 7/00
[52] U.S. Cl. .................................... 432/103; 384/441
[58] Field of Search ............... 432/103; 384/441, 174, 384/204, 203

[56] References Cited

U.S. PATENT DOCUMENTS

| | | | |
|---|---|---|---|
| 3,840,336 | 10/1974 | Brachthauser | 432/103 |
| 4,129,036 | 12/1978 | Bliemeister | 73/140 |
| 4,129,343 | 12/1978 | Janssen | 308/35 |
| 4,171,949 | 10/1979 | Endersen et al. | 432/103 |
| 4,288,128 | 9/1981 | Wells | 308/36.2 |
| 4,320,586 | 3/1982 | Korting | 432/103 |
| 4,500,285 | 2/1985 | Klotmann et al. | 432/103 |
| 4,511,266 | 4/1985 | Klotmann et al. | 384/441 |
| 4,586,664 | 5/1986 | Ianaka et al. | 241/213 |

Primary Examiner—Henry C. Yuen

[57] ABSTRACT

A rotary kiln having a material processing drum rotatably supported by a shaft. The shaft is rotatably supported by a bearing structure having a radial bearing and a thrust bearing. A radial bearing aligner and a thrust bearing aligner are provided for, respectively, aligning the radial bearing and the thrust bearing with the shaft of the drum if the shaft moves relative to the radial bearing and the thrust bearing.

18 Claims, 8 Drawing Sheets

ROTARY KILN

BACKGROUND OF THE INVENTION

1. Field of the Invention

The present invention relates to rotary kilns and, more specifically, to rotary kilns which employ a drum which rotates on at least one shaft. The shaft, in turn, rotates on at least one bearing which automatically axially aligns itself with the longitudinal axis of the shaft.

2. Background Information

Rotary kilns are well known in the art. One particular type of rotary kiln employs an elongated, cylindrical drum that is rotatably supported such that the longitudinal axis of the drum is inclined with respect to the horizontal. Material, to be processed by the kiln, enters the elevated end of the rotating drum while a hot gas, such as air, is blown into the lower end of the rotating drum. As the drum rotates, gravity pulls the material downward, through the drum, while the rising hot gas, moving in the opposite direction of the material, heats the material. The rotation of the drum mixes, or stirs the material and ensures that the hot gas throughly mixes and often reacts with all or a substantial part of the material. The processed material then exits the lower end of the drum.

The drum is rotated on at least one shaft and the shaft is rotated on a at least one bearing. Typically, at least four shafts are employed with each shaft rotating on two bearings. The typical bearing usually includes two bearing surfaces, which are orthogonal to one another, so that the bearing can accept loading in two series of directions; one parallel to the longitudinal axis of the shaft and one orthogonal to the longitudinal axis of the shaft. Under ideal conditions the shaft and the bearing are aligned, with one another, so that the load of the drum and shaft is evenly distributed on the bearing surfaces.

However, several factors can contribute to partial misalignment between the shaft and the bearing surfaces, thereby causing the load of the drum and the shaft to be unevenly supported by the bearing. That, in turn, may cause the bearing surfaces to wear excessively in areas where they are most heavily loaded. Such excessive wear may cause premature failure of the bearing. Factors that may cause uneven loading of the bearing surfaces include uneven weight distribution of the material in the drum, or freezing and thawing of the ground on which the kiln is constructed or settling of piers. Such uneven loading may cause the shaft to become misaligned with the bearing. Also, the drum may even twist due to some warping, possibly because of uneven distribution of hot gas that is blown through the drum.

A need, therefore, exists for a bearing for a rotary kiln, that can automatically align the liner surfaces of the bearing with the shaft, or shafts, of the kiln, even when the rotary drum is unevenly loaded, or when the drum distorts or warps.

Several patents exist which are directed to rotary kilns. U.S. Pat. No. 4,129,036 discloses an alignment indicator for a roller-type support. The device disclosed in this patent provides an indication of the alignment of the bearing and does not automatically compensate for bearing misalignment.

U.S. Pat. No. 4,171,949 discloses an arrangement for supporting a rotary drum such as a rotary kiln. The device disclosed in this patent employs carrying beams which provides mechanical equalization of the forces exerted on a roller of the kiln during rotation of the drum.

U.S. Pat. No. 4,500,285 discloses a rotary kiln with a kiln cylinder that has an annular bearing ring for supporting the kiln. Spacer plates are located between a ring and an outer surface of the cylinder. This patent is not directed to automatically compensating for bearing misalignment.

U.S. Pat. No. 4,511,266 discloses a rotary kiln that is supported on an annular bearing ring having an inner circumference that is larger than the outer circumference of the kiln cylinder. This patent is not directed to automatically compensating bearing misalignment.

Patents relating to bearings include U.S. Pat. No. 4,129,343, which discloses a self-aligning bearing. This patent is not directed to rotary kilns. Further, the bearing disclosed in this patent does not include two orthogonal bearing surfaces that, each, self-align due to bearing misalignment.

U.S. Pat. No. 4,288,128 discloses a self-aligning thrust bearing. This patent, also, is not directed to rotary kilns. Further, the bearing disclosed in this patent does not include two orthogonal bearing surfaces that, each, self-align due to bearing misalignment.

U.S. Pat. No. 4,586,664 discloses a bearing support system for a cone crusher. The device disclosed in this patent is not directed to rotary kilns and does not provide any self-alignment whatsoever.

Rocker seat type bearings, as a trunnion bearings, have been employed in grinding mills. Also, pivoted pad thrust bearings have been employed as part of a radial, multi-pad journal bearing for large grinding mills. Further, water cooling of bearings has been employed in mill trunnion bearings. However, none of these applications employs a device that is similar to the claimed invention.

SUMMARY OF THE INVENTION

The present invention provides a rotary kiln for processing material that includes: a base and a rotatable container supported by the base. The rotatable container apparatus contains the material to be processed. The shaft defines a first longitudinal axis and is rotatably connected between the base and the rotatable container for providing support by the base to the rotatable container. The shaft has two ends. At least one unitary bearing structure includes a first bearing and a second bearing. The first bearing defines a second longitudinal axis. The first bearing also comprises a radial bearing which is interposed between the shaft and the base for facilitating the rotation of the shaft. The first bearing comprises a first bearing aligner which is used for aligning the second longitudinal axis of the first bearing with the first longitudinal axis of the shaft. The first bearing aligner includes a first surface and a second surface. The first surface has at least a part comprising a portion of a substantially circular cylinder. The surface of the portion of the substantially circular cylinder has generatrices defining a first linear direction. The second surface has an at least partially barrel shaped portion. The second surface is positioned to be in contact with and be supported by the first surface, substantially, at a limited area of the barrel shaped portion. The second surface is rockable on the first surface when the second longitudinal axis, of the shaft, moves angularly with respect to the first longitudinal axis. The second bearing defines a first plane. The second bearing includes a thrust bearing which is interposed between one end of the shaft and the base for facilitating the rotation between the shaft and the base. A second bearing aligner is connected to the second bearing for aligning the first plane of the second bearing substantially orthogonal to the first longitudinal axis of the shaft. The second bearing aligner comprises a third surface and a fourth surface. The third surface is at least partially flat and defines a plane which is generally orthogonal to the first linear direction. The fourth surface is at least partially curved and positioned to be in contact with and apply a second force to the third surface. The fourth surface is rockable on the third surface when the second longitudinal axis and shaft moves angularly with respect to the first longitudinal axis, whereby thrust forces from the shaft are taken up by the second bearing aligner.

Another aspect of the invention resides broadly in a bearing structure for a rotary kiln for processing material, wherein the kiln includes a base, a rotatable container supported by the base, with the rotatable container being provided for containing the material to be processed. Also provided is a shaft, defining a first longitudinal axis and rotatably connected between the base and the rotatable container. The shaft is for providing support by the base to the rotatable container. The shaft has an end and at least one unitary bearing structure, with the bearing structure including a first bearing and a second bearing. The first bearing defines a second longitudinal axis and includes a radial bearing, interposed between the shaft and the base, for facilitating the rotation of the shaft. The first bearing includes a first bearing aligner for providing a substantially predetermined alignment of the second longitudinal axis of the first bearing, with the first longitudinal axis of the shaft. The first bearing aligner includes a first surface and a second surface. The first surface has at least a part comprising a portion of a substantially circular cylinder. The surface of the portion of the substantially circular cylinder has generatrices defining a first linear direction. The second surface has an at least partially curved portion which has a bulged part. The second surface is positioned to be in contact with the first surface, substantially at a limited area of the bulged part. The second surface is rockable on the first surface when the second longitudinal axis, with the shaft, moves angularly with respect to the first longitudinal axis. The unitary bearing structure further includes the second bearing which defines a first plane. The second bearing includes a thrust bearing, interposed between the end of the shaft and the base, for facilitating the rotation between the shaft and the base. Also included is a second bearing aligner for being connected to the second bearing, for aligning the first plane of the second bearing substantially orthogonal to the first longitudinal axis of the shaft. The second bearing aligner includes a third surface and a fourth surface. The third surface is at least partially flat and the flat surface defines a plane generally orthogonal to the first linear direction. The fourth surface is at least partially curved and has a bulged part and is positioned to be in contact with and apply a second force to the third surface. The fourth surface is rockable on the third surface when the second longitudinal axis with the shaft moves angularly with respect to the first longitudinal axis, such that thrust forces from the shaft are taken up by the second bearing aligner.

BRIEF DESCRIPTION OF THE DRAWINGS

The following Description of the Preferred Embodiment may be better understood when taken in conjunction with the appended drawings in which.

DESCRIPTION OF THE PREFERRED EMBODIMENT

Figure 1:
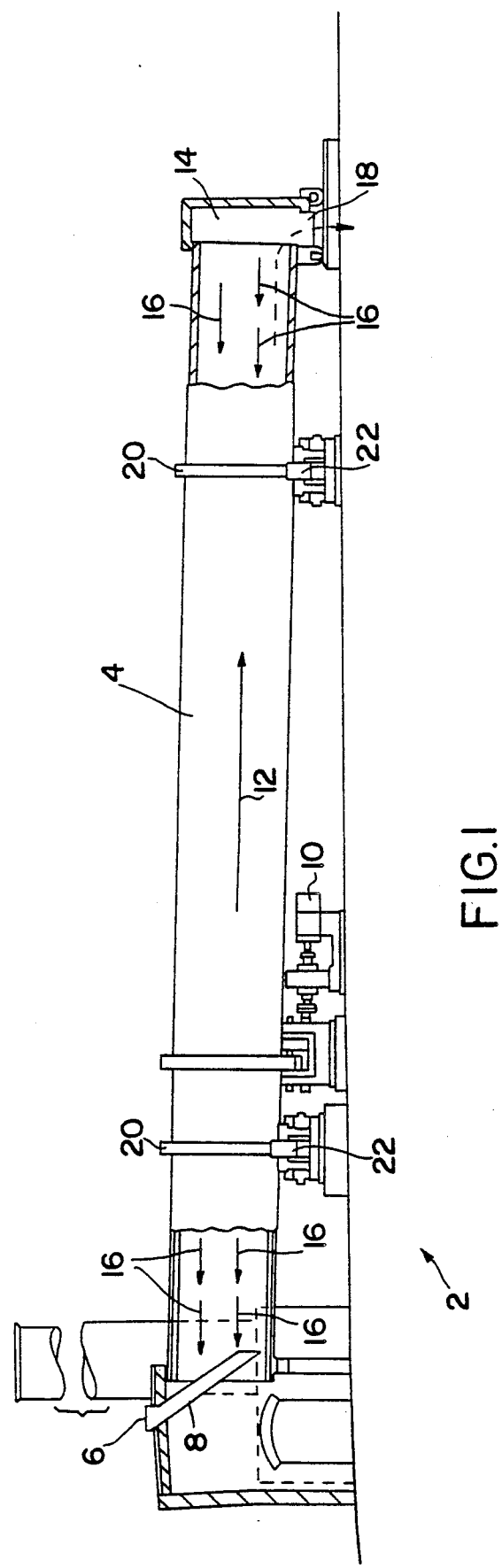
FIG. 1 is a side elevational view of a rotary kiln employing the present invention.
Figure 2:
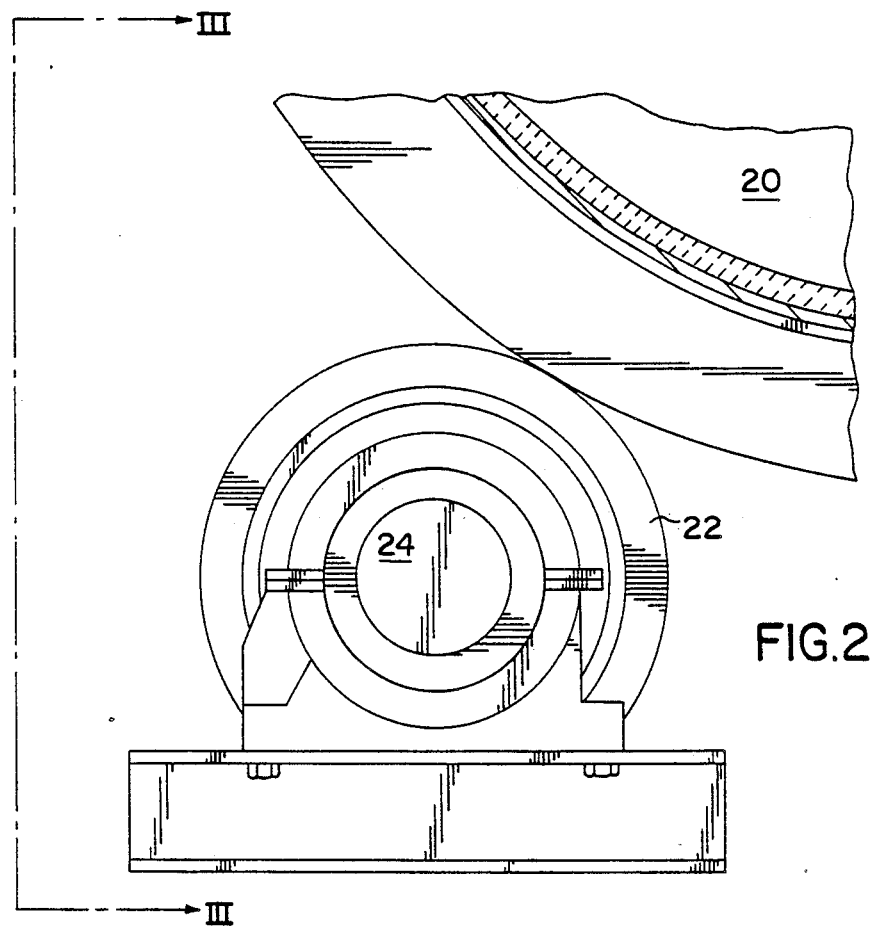
FIG. 2 is a partial front elevational view of the apparatus of FIG. 1.
Figure 3:
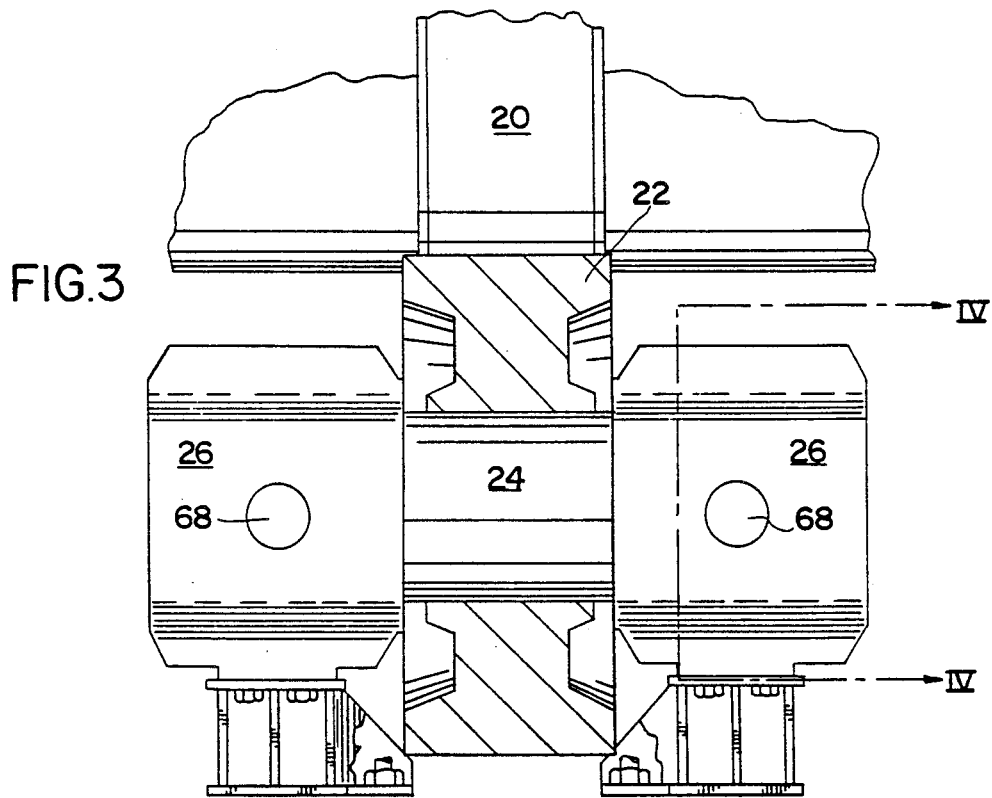
FIG. 3 is a side elevational view of the apparatus of FIG. 2 taken along line III—III.

FIG. 1 of the drawings shows rotary kiln 2. Rotary kiln 2 includes rotating drum 4 for processing material. Inlet port 6, of chute 8, receives the material (not shown) to be processed and deposits it, through chute 8, in rotating drum 4. Rotating drum 4 is rotated by motor unit 10. As rotating drum 4 is rotated, gravity moves the material being processed in the direction of arrow 12. Simultaneously, hot gas is moved from end 14, of rotary kiln 2, in the direction of arrows 16, through drum 4. Thus, the material within rotating drum 4 is heated, as it travels in the direction of arrow 12 through rotating drum 4, and is discharged through chute 18 after processing. Rotating drum 4 has two tirelike structures 20 which are circumferentially positioned around, and affixed to, rotating drum 4. As shown in FIGS. 2 and 3, the tirelike structures 20, in turn, bear directly on wheels 22. Wheels 22, in turn, are supported by shafts 24 (one shown). Shafts 24, in turn, each are supported by two bearing structures 26 (FIG. 3). Each of the bearing structure 26 includes one longitudinal bearing surface, or liner, 30 and one other bearing surface, or liner, 48 which is orthogonal to the longitudinal bearing surface.

Figure 4:
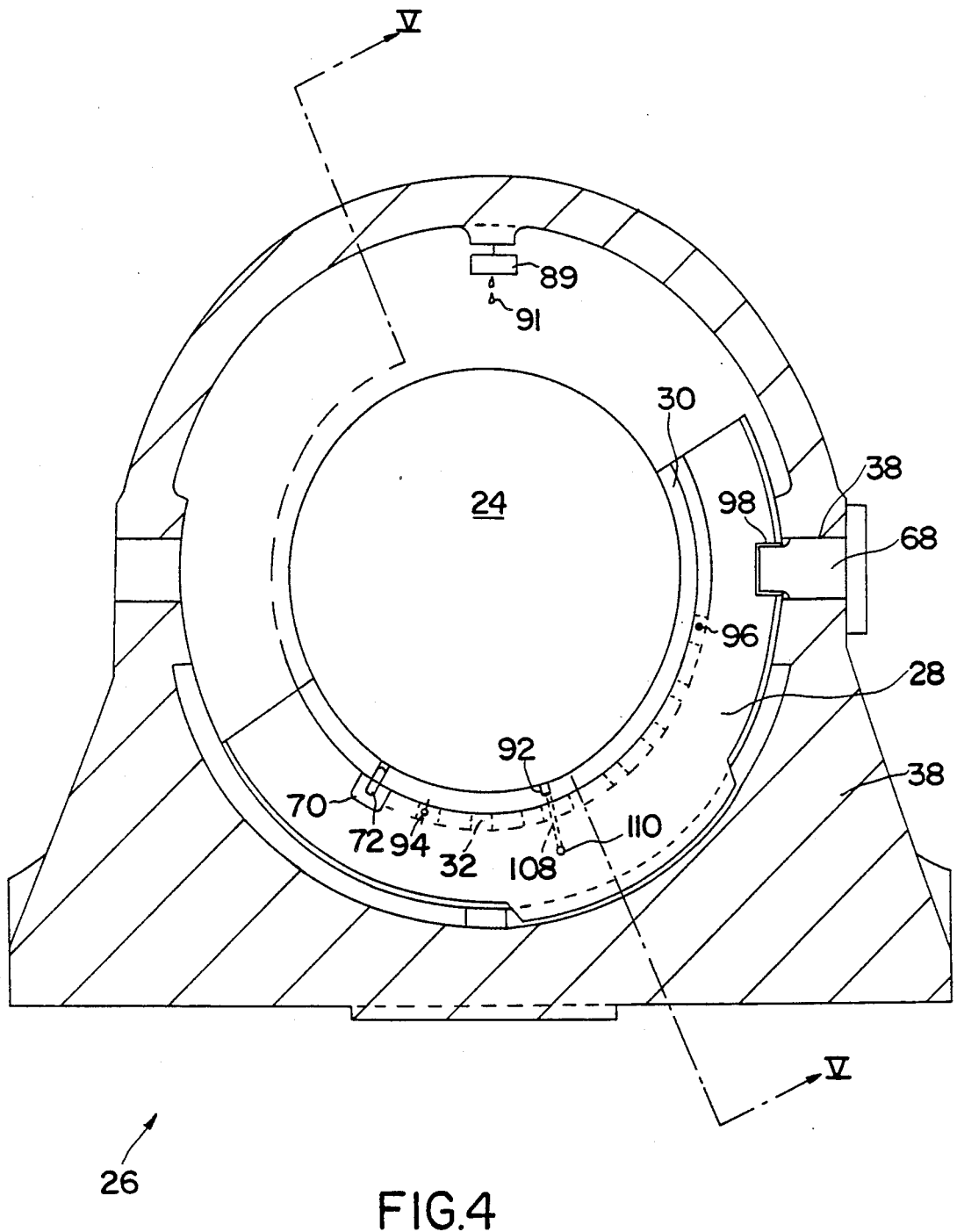
FIG. 4 is a sectional view taken along line IV—IV in FIG. 3.
Figure 5:
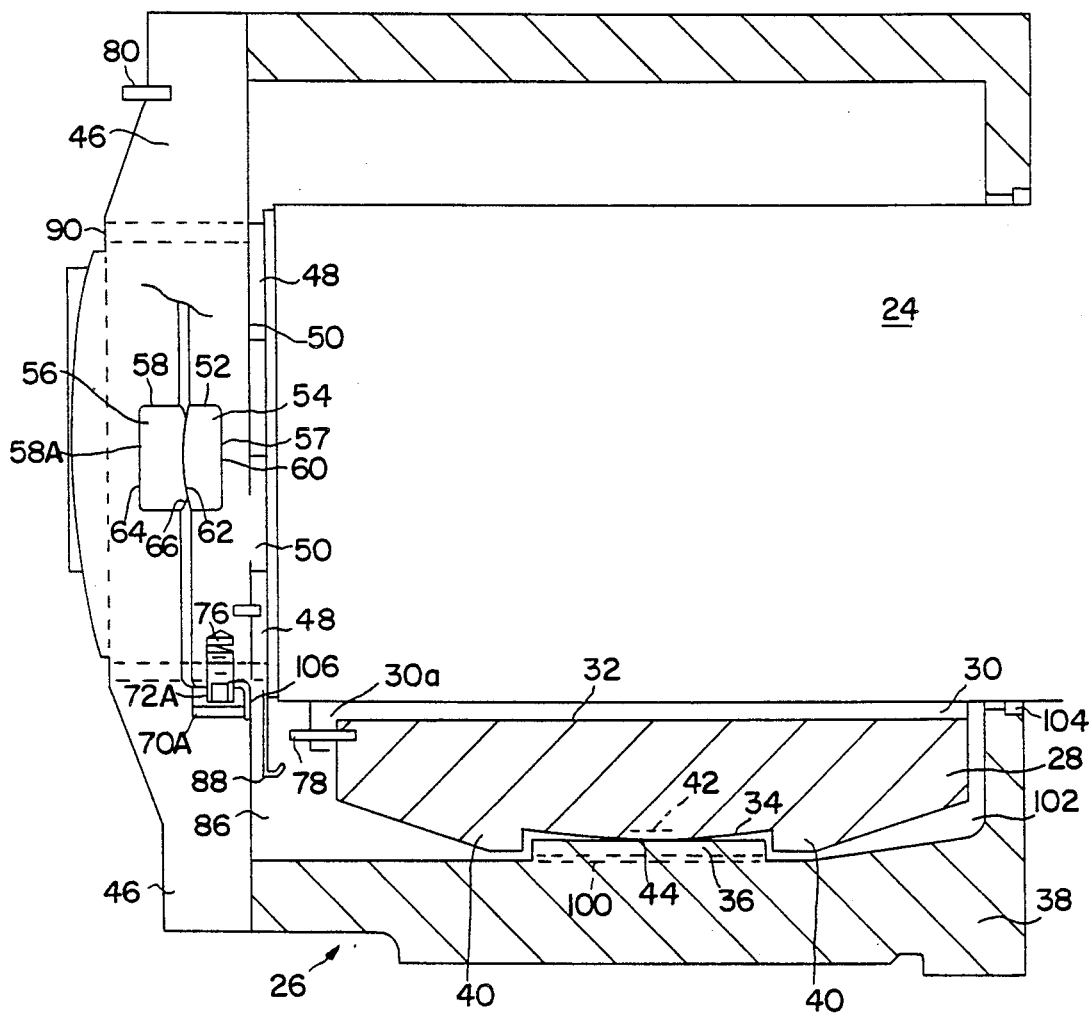
FIG. 5 is a sectional view of the apparatus of FIG. 4 taken along line V—V.
Figure 5A:
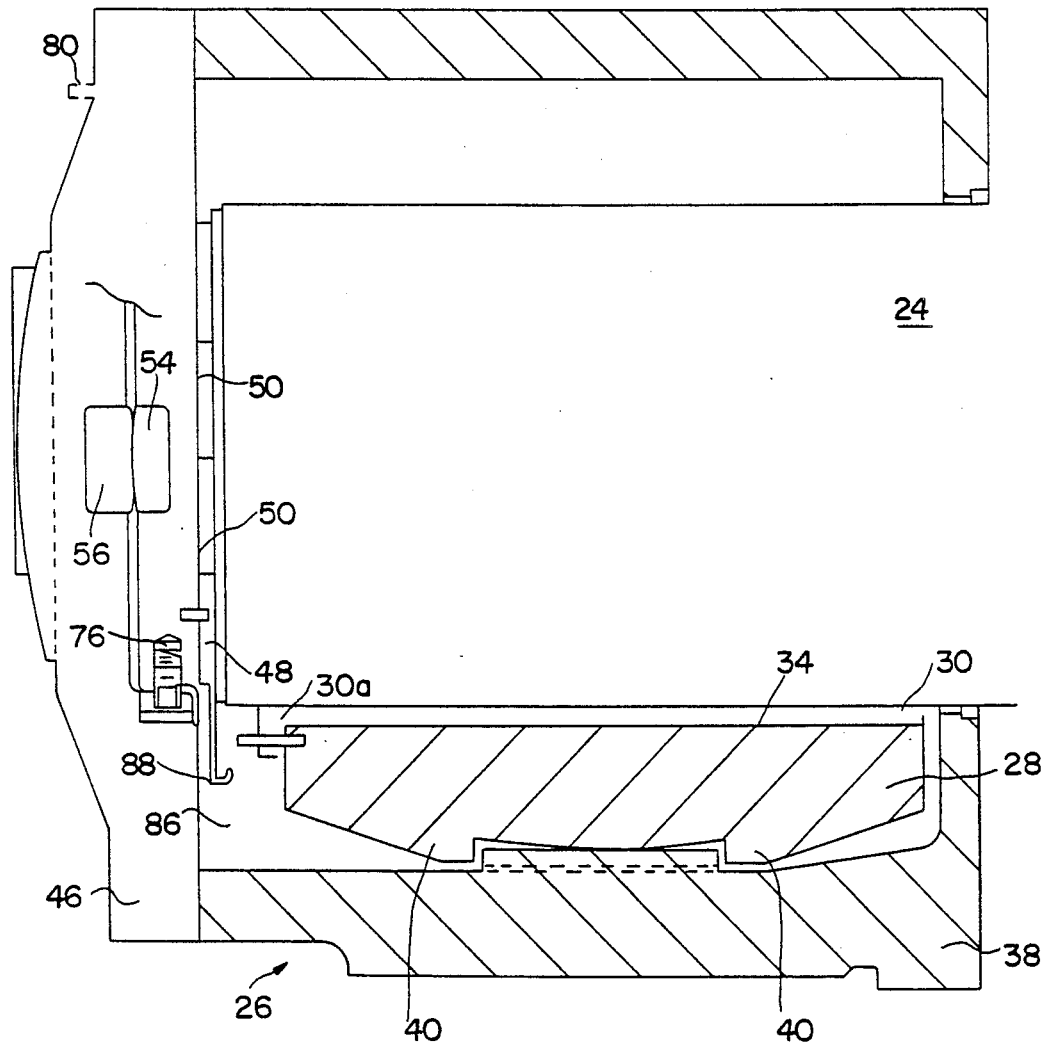
FIG. 5A is another sectional view of the apparatus of FIG. 4.

As shown in FIGS. 4 and 5, shaft 24 is radially supported by radial bearing insert 28. Bearing liner 30 is provided to rotatably support shaft 24 on radial bearing insert 28. Cooling coils 32, which are, preferably, serpentine, in which a mixture of water and ethyleneglycol or some other appropriate fluid is circulated, provides cooling for shaft 24 and bearing liner 30.

Bearing liner 30 is, preferably, somewhat mushroom shaped with a, somewhat, larger cap portion 30a than the remainder thereof. Radial bearing insert 28 includes curved surface 34, on which the bearing insert 28 may rock. Curved surface 34 bears on projection 36 of bearing housing 38. Axial lugs 40, which extend downwardly from curved surface 34, lock into portions of bearing housing 38 to prevent axial movement of radial bearing insert 28 during operation.

Surface 34 is, preferably, somewhat curved, and may be football, or barrel shaped and convex outwardly such that middle portion 42, of curved surface 34, preferably, bears on middle section 44 of projection 36 on bearing housing 38. Curved surface 34 may also be partially spheroidal or even quasi-spheroidal. Bearing end cover 46 is attached to bearing housing 38 by the use of bolts or other appropriate hardware. Curved surface 34 is shown exaggerated while surface 34, in an actual embodiment, is typically much less curved. This is also true for spherical surface 62.

Axial bearing liner, or end thrust wearing plate, 48 which comprises the second surface and which stabilizes the bearing, is positioned at one end of shaft 24. Support plate 50 positions axial bearing liner 48 at one end of shaft 24. Support plate 50 includes blind hole 52 for receiving bearing aligner portion 54. Bearing aligner portion 54 with flat end 57, which seats against the bottom of flat surface 60, receives thrust forces from shaft 24. Adjacent to bearing aligner portion 54 is bearing aligner portion 56, which is positioned in blind hole 58 of bearing end cover 46. Aligner portion 56 is, preferably, a cylindrical button which has flat surface 64 which seats against the bottom of hole 58A. The, preferably, spherical surface 62, of aligner portion 54, is positioned away from shaft 24. Aligner portion 56, also, has flat exterior end surface 66. Curved surface 34 and surface 62 may be barrel or football shaped.

Shaft 24 may become misaligned with bearing structure 26 due to uneven loading in drum 4 and/or warping of drum 4. Also, wear on bearing structure 26 and, possibly, wear on shaft 24 can also cause such misalignment. However, due to the unique configuration of bearing structure 26, as the angle of shaft 24 changes in relation to bearing structure 26, the angle of axial bearing liner 48 and support plate 50 will also change since aligner portion 54 will rock on end surface 66 of aligner portion and bearing insert 28 will rock on projection 36. Consequently, bearing liner 48 and bearing liner 30 will, respectively, rock along with aligner portion 54 and bearing insert 28, thus, keeping bearing structure 26 in alignment with shaft 24. A similar procedure takes place with regard to surfaces 42 and 44.

One, or preferably two or more, radial lugs 72A may be employed to hold support plate 50 and prevent rotation of support plate 50 with respect to the bearing end cover 46. Support plate 50 has hole 76, therein, to received lug or lugs 72A. Preferably, two lugs 72A are employed to prevent this movement. Lugs 72A may, also, be cast into place on plate 50. Radial lug(s) 72A is (are) disposed through hole(s) 76 to engage in a groove(s) 70A.

Key 68 (FIGS. 4, 4A and 4B) is disposed through a hole in bearing housing 38 to engage in hole 98 in the radial bearing insert 28 to prevent angular rotation of insert 28 in the bearing housing 38.

During installation, key 68 is attached to lever 69 with screws or bolts. Preferably, there are two threaded holes in the flange of the key 68 for receiving the screws or bolts holding the lever 69 and also two slotted holes which are not threaded for allowing insertion of the bolts therethrough for fastening the key 68 immovably to the bearing housing 38 while still permitting some adjustment between the key 68 and the bearing housing 38 prior to the tightening down of the bolts holding the key 68 to the bearing housing 38. Key 68 has flat surfaces 73. Diameter 81 of end of key 68 is larger than width W of hole 98. When assembling the kiln, lever 69 is rotated so that either edges 75 or edges 77 are placed in contact with wall 79 of hole 98, thereby centering hole 98 with respect to key 68. Shaft 24 would, then, be lowered onto bearing liner 30 and the key 68 would be rotated back to the position shown in FIGS. 4 and 4A. That, in turn, would return key 68 to the position shown in FIG. 4B. This will center the bearing insert 28 circumferentially with respect to the housing 38.

As shown in FIG. 4, bearing liner 30 is, preferably, only disposed through a 180° arc of bearing structure 26 since the radial bearing forces are only substantially prevalent over a limited portion of bearing liner 30. Bearing liner 30 extends from about 30°, that is at a two o'clock position above the horizontal, to about the eight o'clock position, that is, about 30° below the horizontal on the other side of bearing structure 26. When shaft 24 turns clockwise, the radial bearing force begins to build up at about 20° below the horizontal, or at almost just prior to the four o'clock position. The force gradually builds up until it reaches a maximum just somewhat beyond the five o'clock position and substantially reaches, for practical purposes, zero force at about 20° beyond the five o'clock position.

Cooling coils 32 are positioned from about 20° below the horizontal until about 20° beyond the vertical, that is, from just before the four o'clock position to just before the seven o'clock position. Other arrangements and configurations of coils 32 are, also, possible.

As shown in FIG. 5, bolt 78 prevents axial movement of liner 30 within bearing insert 28. Axial lug(s) 71 is (are) provided to prevent rotation of liner 48 with respect to support plate 50.

Retainer lug(s) 72A is (are) provided to prevent circumferential movement of support plate 50 with respect to bearing end cover 46.

Figure 7:
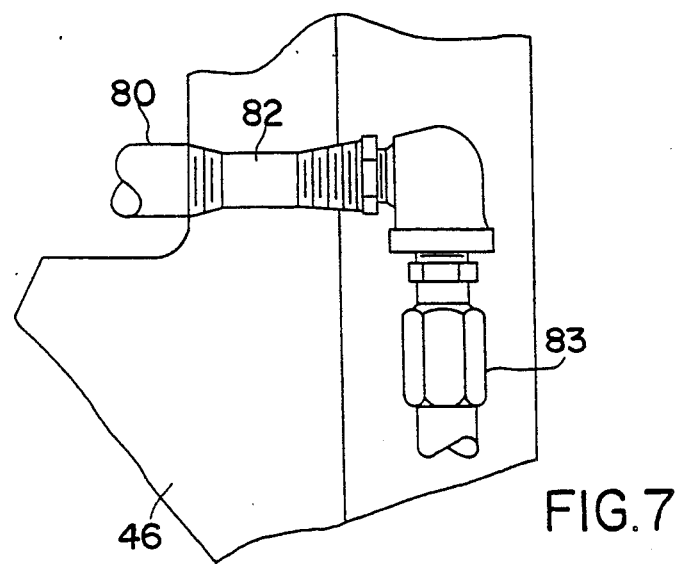
FIGS. 6 and 7 are detailed views of the high pressure oil system of FIG. 5.
Figure 6:
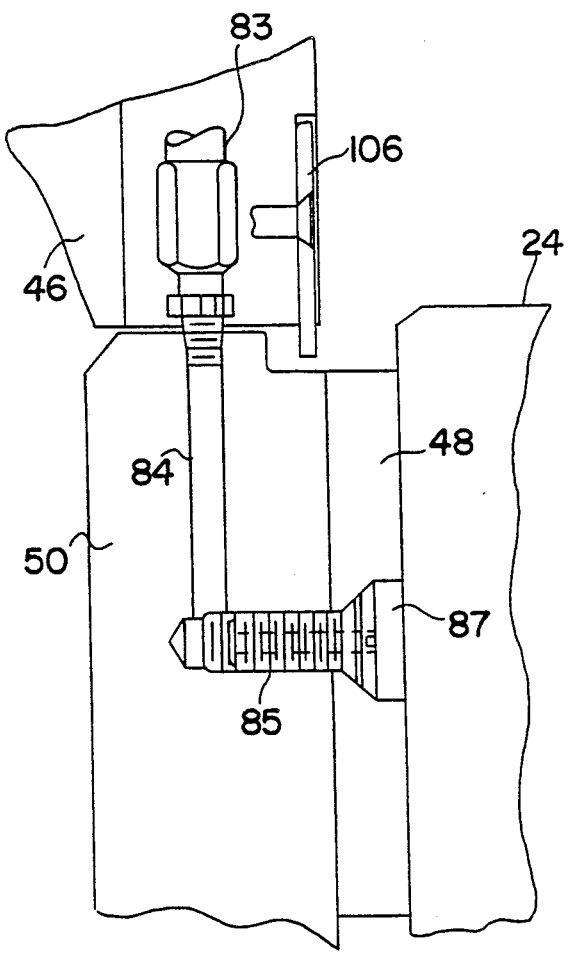

In order to reduce starting friction and improve low speed boundary lubrication with respect to the axial bearing surface that contacts the end of shaft 24, preferably, a high pressure lubrication system may be provided. A suitable high pressure lubrication system is shown in more detail in FIGS. 6 and 7. Lubricant is delivered from a pump system (not shown) through high pressure fitting 80 into conduit 82 in bearing end cover 46. The oil then flows into hose assembly 83, conduit 84 located in support plate 50, through hollow screw 85 and then into annular channel 87 located in axial bearing liner 48. Hose assembly 83 may be flexible to allow for relative movement of parts of the system. The lubricant is then forced in between axial bearing liner 48 and one end of shaft 24.

Oil dippers 88 move oil from reservoir 86 and supply low pressure lubrication between shaft 24 and radial bearing liner 30 (FIG. 5). Oil channel 100 connects reservoir 86 with oil reservoir 102. This allows oil accumulation in oil reservoir 102 to flow through channel 100 and into oil bucket compartment 86.

Oil seal 104 prevents excessive seepage of oil from between shaft 24 and bearing housing 38 and bearing structure 26. As shown in FIG. 4, lubrication pan 89 receives oil and meters oil 91 so that it drips onto and lubricates shaft 24. Retainer 106 is provided for the axial bearing assembly.

Holes 90, of which there are preferably four (two shown), are located approximately as follows: one at 12 o'clock, one at 3 o'clock, one at 6 o'clock and one at 9 o'clock. Holes 90 may, conveniently, be provided to allow a measuring rod to be entered for the purpose of determining the shaft alignment. Thus, the alignment of shaft 24 in the bearing assembly can be configured at least during installation. Also, capacitive ultrasonic proximity sensors (not shown) may, also, be provided for determining shaft alignment.

Lubrication between frictional surfaces of shaft 24 and bearing liner 30 may be conducted through countersunk type hole 92 which is supplied with high pressure oil from the lubrication system. The lubricant enters insert 28 through connector 110 and is lead to hole 92 by conduit 108. Passageway for high pressure lubricant may also be entirely within liner 30.

Figure 4A:
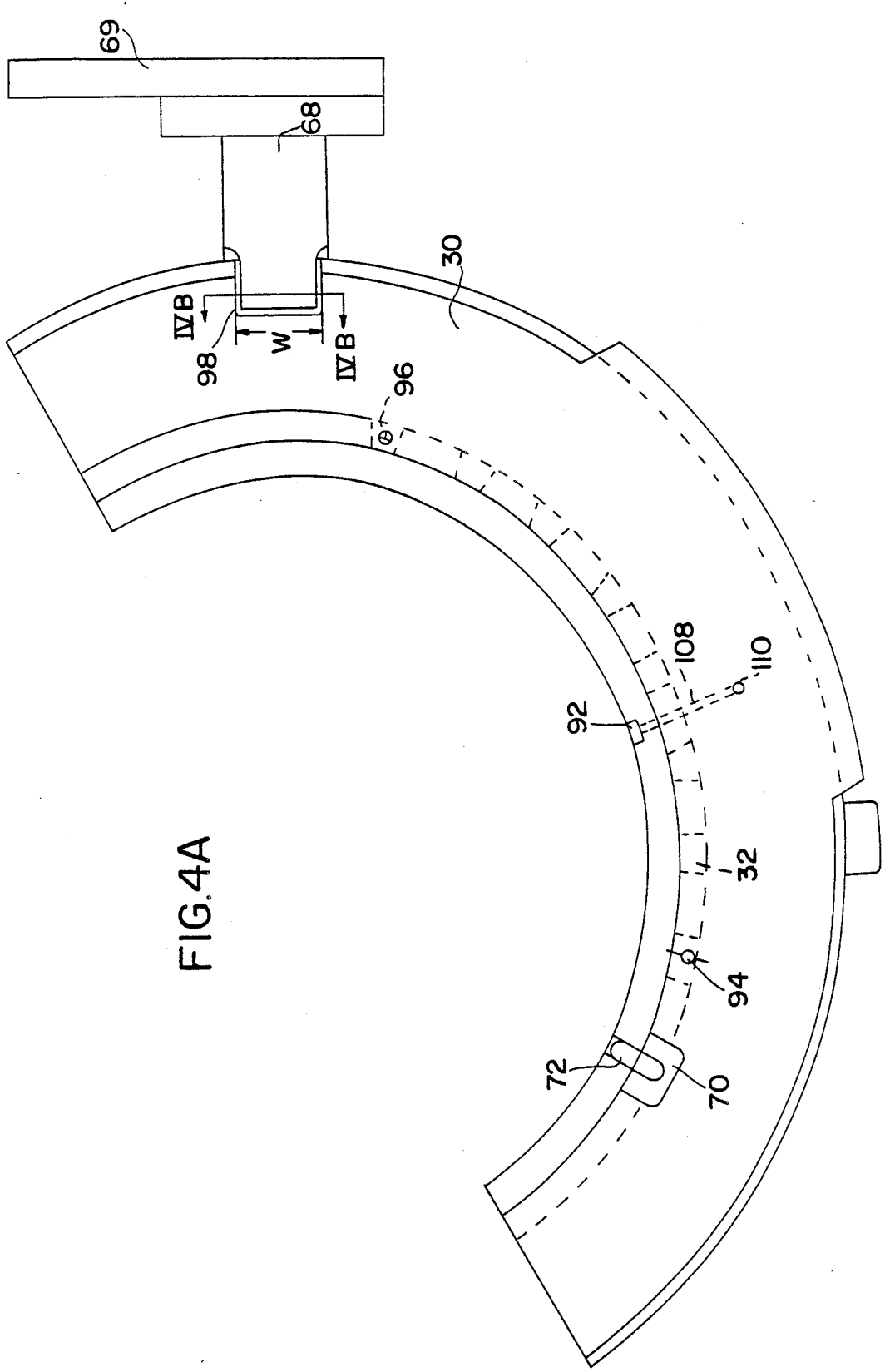
FIG. 4A is an enlarged front elevational view of a portion of the apparatus of FIG. 4.
Figure 4B:
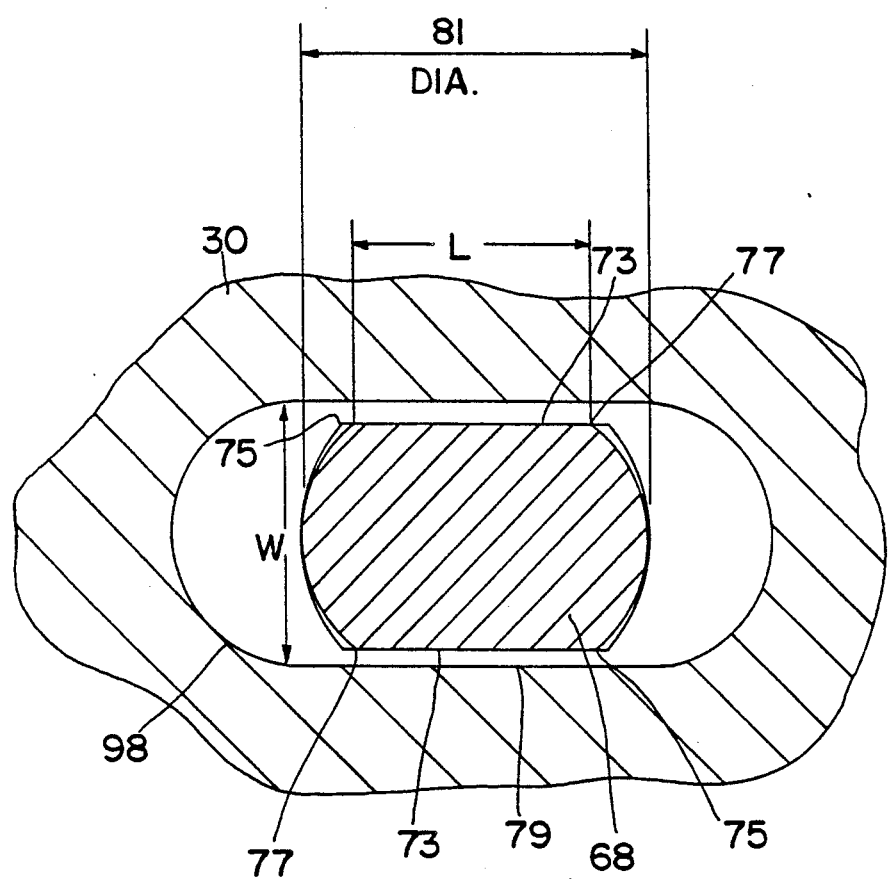
FIG. 4B is an enlarged side elevational view of a portion of the apparatus of FIGS. 4 and 4A taken along line IV B—IV B in FIG. 4A.

As shown in FIG. 4A, coolant may enter cooling coil 32 through hole 94 and exit through hole 96 or, it is possible for coolant to enter through hole 96 and exit through hole 94.

All, or substantially all, of the components and methods of the various embodiments may be used with at least one embodiment or all of the embodiments, if any, described herein.

The reference numerals for parts in one figure correspond to the same parts in other figures even if no reference numeral is shown therein.

All of the patents, patent applications, and publications recited herein, if any, are hereby incorporated by reference as if set forth in their entirety herein.

The invention as described hereinabove in the context of the preferred embodiment is not to be taken as limited to all of the provided details thereof, since modifications and variations thereof may be made without departing from the spirit and scope of the invention.

What is claimed is:

1. A rotary kiln for processing material, said kiln comprising:
   base means;
   rotatable container means supported by said base means, said rotatable container means for containing the material to be processed;
   shaft means defining a first longitudinal axis and rotatably connected between said base means and said rotatable container means, said shaft means for providing said support by said base means to said rotatable container means;
   said shaft means having an end;
   at least one unitary bearing structure comprising first bearing means and second bearing means;
   said first bearing means defining a second longitudinal axis;
   said first bearing means comprising radial bearing means interposed between said shaft means and said base means for facilitating said rotation of said shaft means;
   said first bearing means comprising first bearing aligner means;
   said first bearing aligner means for providing a substantially predetermined alignment of said second longitudinal axis of said first bearing means with said first longitudinal axis of said shaft means;
   said first bearing aligner means comprising:
   first surface means and second surface means;
   said first surface means having at least a part comprising a portion of a substantially circular cylinder, the surface of said portion of said substantially circular cylinder having generatrices defining a first linear direction;
   said second surface means comprising an at least partially curved portion having a bulged part;
   said second surface means being positioned to be in contact with said first surface means substantially at a limited area of said bulged part;
   said second surface means being rockable on said first surface means when said first longitudinal axis of said shaft means moves angularly with respect to said second longitudinal axis of said first bearing means;
said at least one unitary bearing structure further comprising:
   said second bearing means defining a first plane;
   said second bearing means comprising thrust bearing means interposed between said end of said shaft means and said base means for facilitating said rotation between said shaft means and said base means; and
   second bearing aligner means for being connected to said second bearing means for aligning said first plane of said second bearing means substantially orthogonal to said first longitudinal axis of said shaft means;
   said second bearing aligner means comprising:
   third surface means and fourth surface means;
   said third surface means being at least partially flat and said at least partially flat surface defining a plane generally orthogonal to said first linear direction; and
   said fourth surface means being at least partially curved and having a bulged part and positioned to be in contact with and apply a second force to said third surface means, said fourth surface means being rockable on said third surface means when said first longitudinal axis of said shaft means moves angularly with respect to said second longitudinal axis of said first bearing means, such that thrust forces from said shaft are taken up by said second bearing aligner means.

2. The rotary kiln of claim 1, further including first bearing aligner insert means for being connected to said first bearing means, said first bearing aligner insert means defining said second surface means.

3. The rotary kiln of claim 2, further including first bearing liner means for being connected to said first bearing aligner insert means, said first bearing liner means for facilitating said rotation between said shaft means and said frame means.

4. The rotary kiln of claim 3, further including second bearing aligner insert means for being connected to said frame means, said second bearing insert means defining said first surface means.

5. The rotary kiln of claim 4, further including third bearing aligner insert means for being connected to said second bearing means, said third bearing aligner insert means defining said fourth surface means.

6. The rotary kiln of claim 5, further including second bearing liner means for being connected to said third bearing aligner insert means, said second bearing liner means for facilitating said rotation between said shaft means and said frame means.

7. The rotary kiln of claim 6, further including fourth bearing aligner insert means for being connected to said frame means, said fourth bearing aligner insert means defining said third surface means.

8. The rotary kiln of claim 7, further including cooling means positioned adjacent said first bearing liner means for cooling said bearing liner means.

9. The rotary kiln of claim 1, wherein said bulged part is barrel shaped.

10. A bearing structure for a rotary kiln for processing material, said kiln comprising base means, rotatable container means supported by said base means, said rotatable container means for containing the material to be processed, shaft means defining a first longitudinal axis and rotatably connected between said base means and said rotatable container means, said shaft means for providing said support by said base means to said rotatable container means, said shaft means having an end and at least one unitary bearing structure, said bearing structure comprising:

first bearing means and second bearing means;

said first bearing means defining a second longitudinal axis;

said first bearing means comprising radial bearing means for being interposed between said shaft means and said base means for facilitating said rotation of said shaft means;

said first bearing means comprising first bearing aligner means;

said first bearing aligner means for providing a substantially predetermined alignment of said second longitudinal axis of said first bearing means with said first longitudinal axis of said shaft means;

said first bearing aligner means comprising:

first surface means and second surface means;

said first surface means having at least a part comprising a portion of a substantially circular cylinder, the surface of said portion of said substantially circular cylinder having generatrices defining a first linear direction;

said second surface means comprising an at least partially curved portion having a bulged part;

said second surface means being positioned to be in contact with said first surface means substantially at a limited area of said bulged part;

said second surface means being rockable on said first surface means when said first longitudinal axis of said shaft means moves angularly with respect to said second longitudinal axis of said first bearing means;

said unitary bearing structure further comprising:

said second bearing means defining a first plane;

said second bearing means comprising thrust bearing means interposed between said end of said shaft means and said base means for facilitating said rotation between said shaft means and said base means; and second bearing aligner means for being connected to said second bearing means for aligning said first plane of said second bearing means substantially orthogonal to said first longitudinal axis of said shaft means;

said second bearing aligner means comprising:

third surface means and fourth surface means;

said third surface means being at least partially flat and said at least partially flat surface defining a plane generally orthogonal to said first linear direction; and said fourth surface means being at least partially curved and having a bulged part and positioned to be in contact with and apply a second force to said third surface means, said fourth surface means being rockable on said third surface means when said first longitudinal axis of said shaft means moves angularly with respect to said second longitudinal axis of said first bearing means, such that thrust forces from said shaft are taken up by said second bearing aligner means.

11. The bearing of claim 10, further including first bearing aligner insert means for being connected to said first bearing means, said first bearing aligner insert means defining said second surface means.

12. The bearing of claim 11, further including first bearing liner means for being connected to said first bearing aligner insert means, said first bearing liner means for facilitating said rotation between said shaft means and said frame means.

13. The bearing of claim 12, further including second bearing aligner insert means for being connected to said frame means, said second bearing insert means defining said first surface means.

14. The bearing of claim 13, further including third bearing aligner insert means for being connected to said second bearing means, said third bearing aligner insert means defining said fourth surface means.

15. The bearing of claim 14, further including second bearing liner means for being connected to said third bearing aligner insert means, said second bearing liner means for facilitating said rotation between said shaft means and said frame means.

16. The bearing of claim 15, further including fourth bearing aligner insert means for being connected to said frame means, said fourth bearing aligner insert means defining said third surface means.

17. The bearing of claim 16, further including cooling means positioned adjacent said first bearing liner means for cooling said bearing liner means.

18. The bearing of claim 10, wherein said bulged part is barrel shaped.

* * * * *